United States Patent [19]

Whitby et al.

[11] 3,957,290

[45] May 18, 1976

[54] FLEXIBLE PIPE JOINTS

[75] Inventors: Colin Robert Whitby; John Richardson, both of Warrington, England

[73] Assignee: United Kingdom Atomic Energy Authority, London, England

[22] Filed: Aug. 13, 1974

[21] Appl. No.: 497,067

[30] Foreign Application Priority Data
Sept. 21, 1973  United Kingdom............... 44469/73

[52] U.S. Cl. ................................. 285/114; 285/226
[51] Int. Cl.² ......................................... F16L 27/00
[58] Field of Search ........... 285/114, 226, 227, 228, 285/229, 299, 300, 301

[56] References Cited
UNITED STATES PATENTS

| | | | |
|---|---|---|---|
| 993,934 | 5/1911 | Witzenmann | 285/114 |
| 1,759,567 | 5/1930 | Dibner | 285/114 X |
| 2,335,478 | 11/1943 | Bergman | 285/226 X |
| 2,713,503 | 7/1955 | Ekholm | 285/226 X |
| 2,745,683 | 5/1956 | Nihlen | 285/226 X |
| 2,954,990 | 10/1960 | Binns | 285/226 X |
| 2,969,247 | 1/1961 | Eggmann | 285/114 |
| 3,029,094 | 4/1962 | Parlasca et al. | 285/114 |
| 3,186,742 | 6/1965 | Frankel et al. | 285/226 X |
| 3,501,173 | 3/1970 | Petersen et al. | 285/114 |
| 3,647,246 | 3/1972 | Burtis | 285/114 |

Primary Examiner—Thomas F. Callaghan
Attorney, Agent, or Firm—Larson, Taylor & Hinds

[57] ABSTRACT

A flexible pipe joint comprising a cylindrical tie member for tieing the ends of pipes together and a flexible envelope for fluid flow conduction between the pipes. The tie member comprises a plurality of annular series of parallel tie bars arranged co-axially and there is adjustable mounting means for the tie member in the envelope for enabling the tie member to accommodate misalignment of the pipes on installation. Further misalignment produced by thermal expansion of the pipes is accommodated by the tie member by uniform flexing of the tie bars.

3 Claims, 5 Drawing Figures

FLEXIBLE PIPE JOINTS

BACKGROUND OF THE INVENTION

This invention relates to flexible joints for pipes.

A bellows unit is commonly used to provide a flexible joint between two pipes, the bellows unit being capable of expanding and contracting to accommodate longitudinal movements of the ends of the pipes and of containing fluid pressure. To react the tensile force created by fluid pressure in the pipes it is known to provide ties between the pipes such ties being pivotably connected to allow limited misalignment of the longitudinal axes of the pipes. In some applications of flexible pipe joints, for example, coolant conducting pipes for nuclear reactors, pivotted ties are not acceptable because access to the joints for maintenance is difficult and pivotted ties operating at high temperature can be troublesome.

SUMMARY OF THE INVENTION

According to the invention, a flexible joint for joining the ends of two pipes comprises:

a tie member for the pipes and an expansible sleeve for sealingly connecting the pipes, the tie member comprising a cylindrical component of openwork structure defining at least one annular series of parallel tie bars extending between two parallel annular end fittings, the expansible sleeve having rigid tubular end pieces for engaging the ends of the pipes, the end pieces presenting abutments to the annular end fittings of the tie member, and wherein there is adjusting means complementary to the end fittings of the tie member and the abutments for tensioning the tie member and enabling the tie member to be installed in a pipe line with its axis inclined to the axis of at least one end piece.

When installed in a pipe line the tie bars of the tie member are of equal length so that misalignment of the axes of the joined pipes is accommodated by uniform flexing of each tie bar.

The tie member may comprise a tube having longitudinally extending slots to define the tie bars or may comprise an annular series of discrete tie bars screwed to the end fittings with ends encastre. By ends encastre is meant that the end regions of the tie bars are built into the end fittings so that the end regions are rigidly secured and radially supported.

The expansible sleeve may be disposed inside or outside of the openwork structure of the tie member.

DESCRIPTION OF THE DRAWINGS

The accompanying fragmentary drawings illustrate constructional embodiments of the invention which are described by way of example.

DESCRIPTION OF THE PREFERRED EMBODIMENTS

Figure 1A:
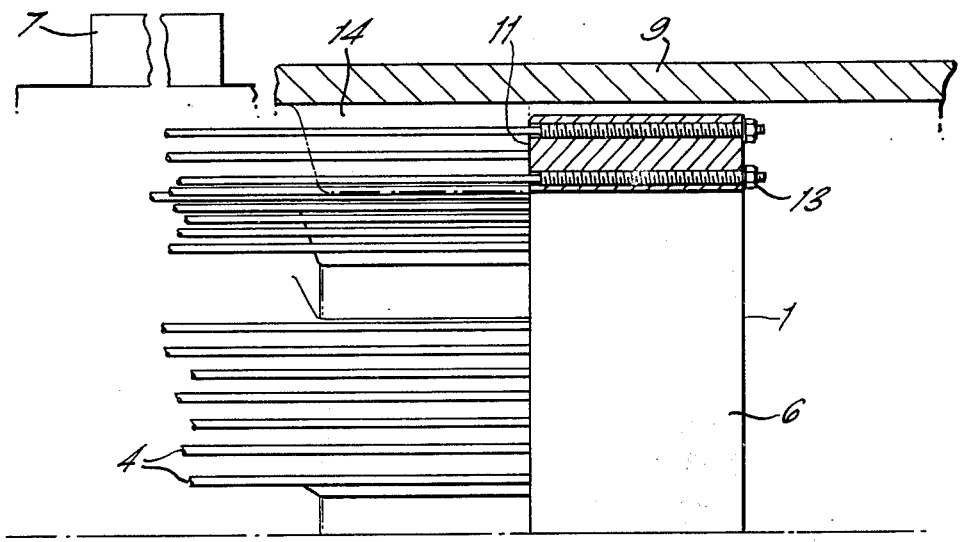
FIGS. 1a and 1b in combination provide a sectional view of one construction of flexible pipe joint, FIG. 1a being the right hand side of the construction and FIG. 1b being the left hand side, FIG. 1a being a section on line Ia—Ia of FIG. 2, and FIG. 1b being a section on line Ib—Ib of FIG. 2.
Figure 1B:
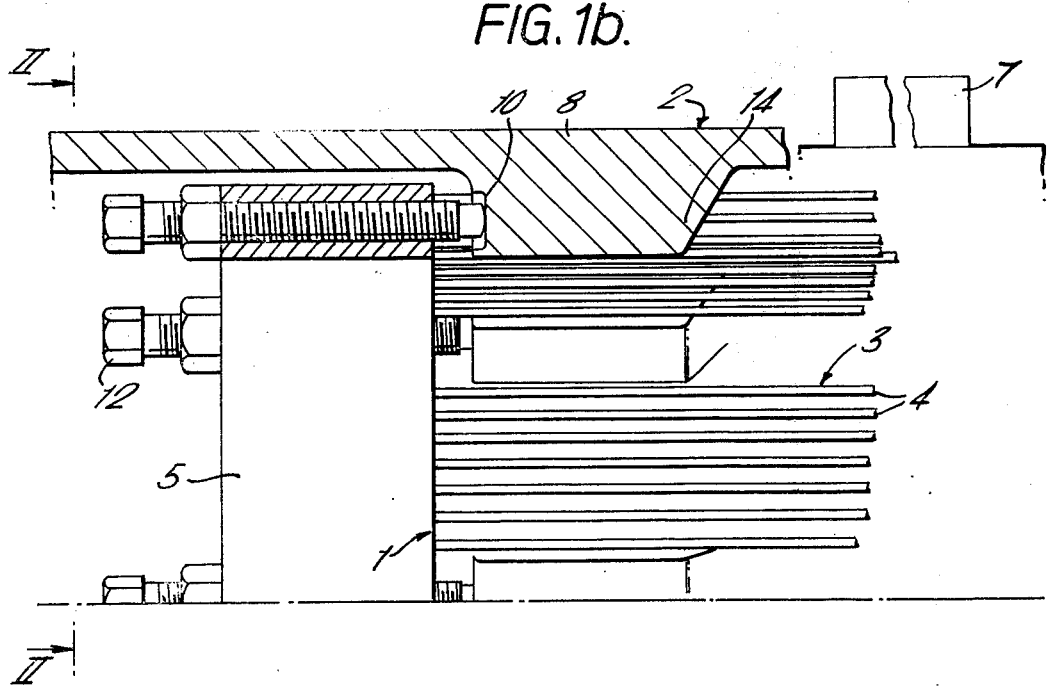
Figure 2:
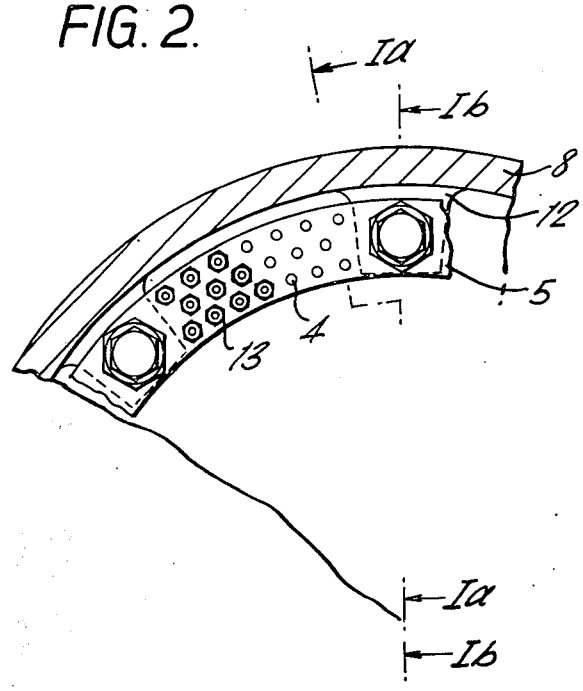
FIG. 2 is a cross-section on line II—II of FIG. 1b.

The flexible pipe joint shown in FIGS. 1a, 1b and 2 comprises a tie member 1 and expansible sleeve 2. The tie member comprises a cylindrical component of openwork structure 3 formed by three co-axially arranged annular series of parallel tie bars 4 end secured to end fittings 5 and 6. The end fittings 5 and 6 are parallel and have a common axis so that all the tie bars are of equal length. The expansible sleeve 2 comprises a bellows pair 7 adapted to engage the ends of pipes by end pieces 8, 9. The end pieces 8, 9 provide abutments 10, 11 for the end fitting 5, 6 of the tie member.

Jacking set bolts 12 mounted on the end fitting 5 provide adjusting means complementary to the end fitting 5 and on the abutment 10 of end piece 8 for tensioning the tie member and enabling the tie member to be installed in a pipe line with its axis inclined to the axis of the end piece 8 thereby accommodating angular misalignment of the joined pipes. In use the tie bars 4 deform in the same manner to accommodate displacement of the axes of the pipes due to thermal expansion.

The abutment means of the end pieces comprise eight internal lugs 14 in each end piece and the tie bars are arranged in eight groups of twenty bars which extend between pairs of lugs. The tie bars 4 are of stainless steel and are secured in the end fittings with ends encastre, that is, the tie bars pass through the full thickness of the end fittings with a close fit so that part lengths of each bar are radially supported in passage through the fittings. Each end of each bar is secured by a nut 13

To assemble the joint, the flexible sleeve 2 is held in a jig and the end fittings 5, 6 are positioned within the envelope and held parallel with their longitudinal axes aligned.

The bars are inserted in the end fittings 5, 6 and tensioned equally by the nuts 13. On installation in a pipeline the end pieces 8, 9 may require to be relatively angularly displaced in which case the end fittings 5, 6 are maintained parallel by adjusting the jacking set bolts 12.

Figure 4:
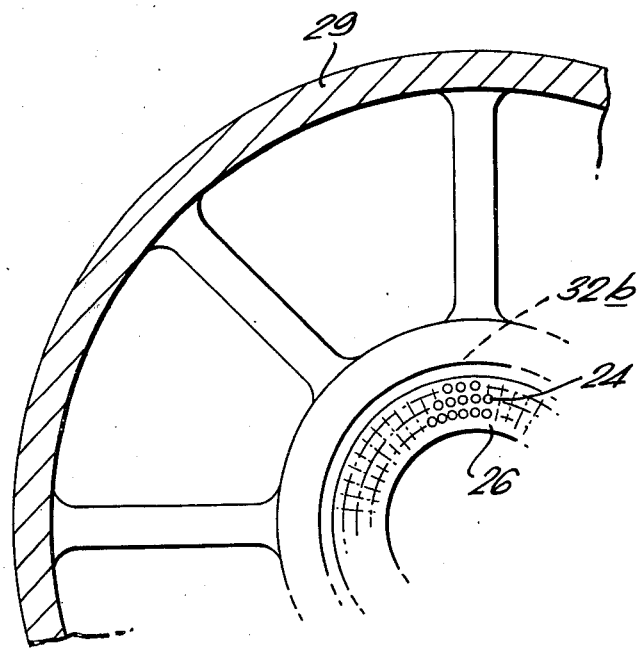
FIG. 4 is a cross-section on line IV—IV of FIG. 3.
Figure 3:
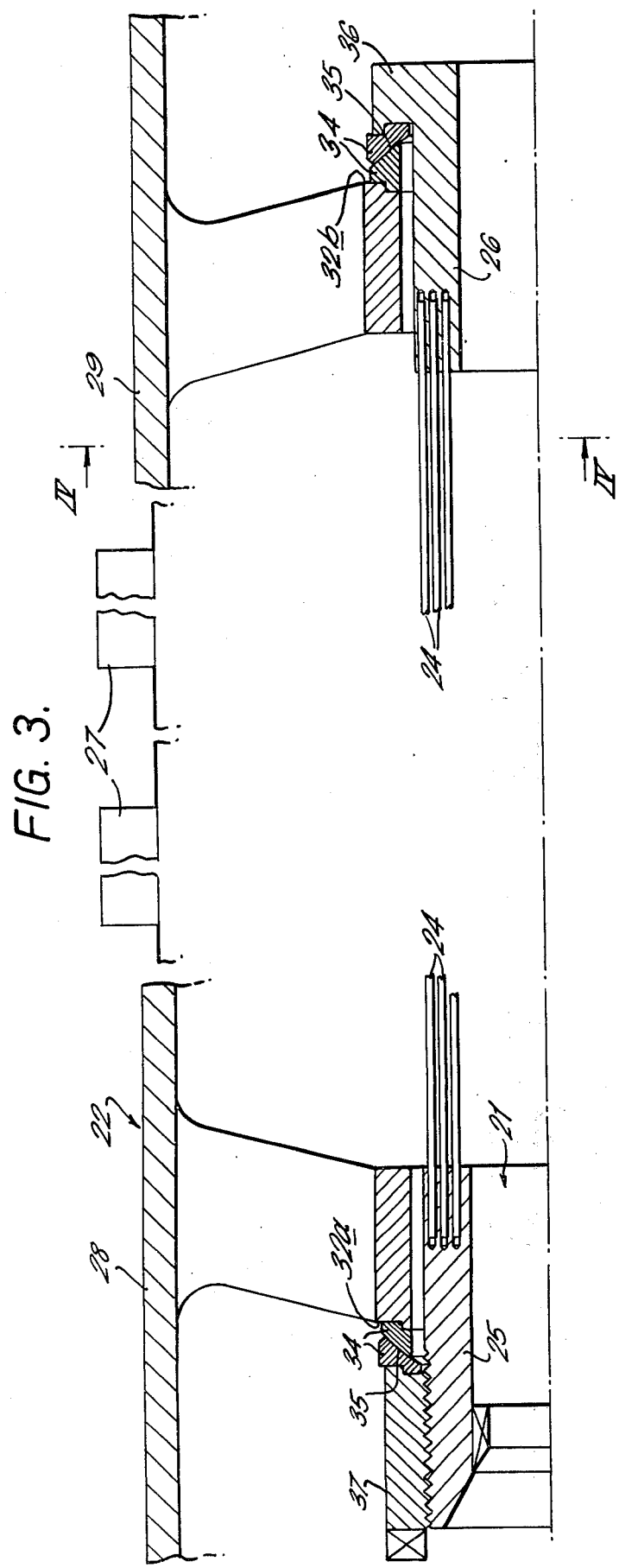
FIG. 3 is a sectional view of a second construction of flexible pipe joint.

In the construction of flexible pipe joint shown in FIGS. 3 and 4 the tie member is designated 21 and the expansible sleeve 22. The tie member comprises a pair of longitudinally spaced tubular end fittings 25, 26 having three co-axial series of tie bars 24 extending therebetween. The exapnsible sleeve 22 comprises a bellows pair 27 with end pieces 28, 29 which have internal annular abutment faces 32a 32b for the end fittings 25, 26 of the tie member. Adjustable abutment means, for enabling the end pieces 28, 29 to be installed in a pipe line with their axes inclined to the common axis of the end fittings 25, 26 comprise pairs or abutment rings 34 having part spherical seatings 35. A pair of abutment rings 34 are disposed between a flange 36 of the end fitting 26 and the face 32b of the end piece 29. A second pair of abutment rings 34 are disposed between the face 32a of the end piece 28 and a screwed retaining collar 37 on the end fitting 25. On assembly of the flexible pipe joint, a jig is used to assemble the tie member; the tie bars 24 are secured to the end fittings 25, 26 with ends encastre by furnace brazing. The tie member is removed from the jig and assembled in the expansible sleeve with the abutment rings 34. On installation in a pipeline the abutment rings 34 enable the end pieces 28, 29 to incline relative to the longitudinal axis of the tie member.

In another construction which is not illustrated by the drawings, the openwork structure is formed from a cylindrical tube having end fittings. The tube is slotted longitudinally to form the tie bars which will be of generally rectilinear cross-section. Where desirable to increase the total quantity of the tie bars two or more cylindrical tubes arranged co-axially and slotted to form tie bars may be used.

Flexible pipe joints constructed as described are particularly useful in applications where sliding surfaces are precluded because of the risk of seizure, for example, in the liquid sodium environment at a liquid sodium cooled nuclear reactor or in an inert gas environment where the use of lubricants is precluded.

We claim:

1. A flexible joint for joining the ends of two pipes, the joint comprising:
    a tie member for the pipes, the tie member consisting of a generally cylindrical component of openwork structure and comprising a plurality of annular series of parallel tie bars extensing between two parallel annular end fittings, the series being co-axial with the longitudinal axis of the component and the ends of the bars being secured to the end fittings with ends encastre,
    an expansible sleeve for sealingly connecting the pipes and enveloping the tie member, the expansible sleeve having rigid tubular end pieces for engaging the ends of the pipes, the end pieces presenting abutments to the annular end fittings of the tie member, and
    adjusting means complementary to the end fittings of the tie member and the abutments for tensioning the tie member and enabling the tie member to be installed in a pipe line with its axis inclined to the axis of one end piece.

2. A flexible joint according to claim 1 wherein the adjusting means comprises an annular series of jacking set bolts arranged to react between one end fitting of the tie member and the abutment of one end piece.

3. A flexible joint for joining the ends of two pipes, the joint comprising:
    a tie member for the pipes, the tie member consisting of a generally cylindrical component of openwork structure and comprising a plurality of annular series of parallel tie bars extending between two parallel annular end fittings, the series being co-axial with the longitudinal axis of the component and the ends of the tie bars being secured to the end fittings with ends encastre,
    an expansible sleeve for sealingly connecting the pipes and enveloping the tie member, the expansible sleeve having rigid tubular end pieces for engaging the ends of the pipes, the end pieces presenting abutments to the annular end fittings of the tie member, and
    adjusting means complementary to the end fittings of the tie member and the abutments for tensioning the tie member and enabling the tie member to be installed in a pipe line with its axis inclined to the axis of at least one end piece, the abutments and end pieces having co-operating complementary part-spherical bearing surfaces and the adjusting means comprising a screw collar mounted on the tie member and arranged for urging the complementary part-spherical surfaces together.

* * * * *